United States Patent [19]

Nohr et al.

[11] Patent Number: 5,665,803
[45] Date of Patent: Sep. 9, 1997

[54] SHAPED ARTICLES HAVING IMPROVED PROPERTIES

[75] Inventors: Ronald Sinclair Nohr, Roswell; John Gavin MacDonald, Decatur; Peter Michlovich Kobylivker, Marietta; Gunilla Elsa Gillberg-LaForce, Roswell, all of Ga.

[73] Assignee: Kimberly-Clark Corporation, Neenah, Wis.

[21] Appl. No.: 411,628
[22] PCT Filed: Oct. 12, 1993
[86] PCT No.: PCT/US93/09748
  § 371 Date: Jul. 7, 1995
  § 102(e) Date: Jul. 7, 1995
[87] PCT Pub. No.: WO94/09066
  PCT Pub. Date: Apr. 28, 1994

Related U.S. Application Data

[63] Continuation-in-part of Ser. No. 958,630, Oct. 9, 1992, abandoned.
[51] Int. Cl.$^6$ .................................................. C08K 5/54
[52] U.S. Cl. .......................... 524/267; 524/269; 524/493; 428/323; 428/327; 19/299
[58] Field of Search ..................... 524/267, 269, 524/493; 428/323, 327; 19/299

[56] References Cited

U.S. PATENT DOCUMENTS

| 5,336,707 | 8/1994 | Nohr et al. | 524/269 |
| 5,344,862 | 9/1994 | Nohr et al. | 524/269 |
| 5,413,655 | 5/1995 | Nohr et al. | 524/269 |

*Primary Examiner*—Melvyn I. Marquis
*Attorney, Agent, or Firm*—William E. Maycock

[57] ABSTRACT

A melt-extrudable thermoplastic composition is proved which includes a thermoplastic polymer and an improved additive system. In one embodiment, a melt-extrudable thermoplastic composition is provided which includes a thermoplastic polyolefin and an improved additive system made up of a first component and a second component, in which (A) the first component is a defined alkyl-substituted polysiloxane having a number-average molecular weight of from about 3,000 to about 36,000 and which is present in an amount of from about 0.01 to about 3 percent by weight, based on the amount of thermoplastic polyolefin; and (B) the second component is a hydrophobic fumed silica, in which the weight ratio of the first component to the second component is in the range of from about 10 to about 70. In a desired embodiment, the particles of second component are in the range of from about 0.001 to about 1 micrometer. The composition yields, upon melt extrusion, nonwoven webs having significantly increased tensile strengths when compared to nonwoven webs prepared from the thermoplastic polyolefin alone.

25 Claims, 11 Drawing Sheets

SHAPED ARTICLES HAVING IMPROVED PROPERTIES

This is a continuation-in-part of application Serial No. 07/958,630, filed on Oct. 9, 1992, abandoned

CROSS-REFERENCE TO RELATED APPLICATION

Nonwoven webs having improved tensile strength characteristics are described and claimed in copending and commonly assigned application Ser. No. 07/783,438, entitled THERMOPLASTIC COMPOSITIONS AND NON-WOVEN WEBS PREPARED THEREFROM and filed Oct. 25, 1991, U.S. Pat. No. 5,344,862, in the names of Ronald S. Nohr and J. Gavin MacDonald.

BACKGROUND OF THE INVENTION

The present invention relates to a melt-extrudable thermoplastic composition which contains an additive system, and to shaped articles made therefrom.

Thermoplastic compositions are described in U.S. Pat. No. 4,923,914 to Ronald S. Nohr and J. Gavin MacDonald, incorporated herein by reference, which include at least one thermoplastic polymer and at least one defined additive. The additive particularly is a siloxane-containing compound. The compositions are especially useful for the formation of nonwoven webs by such melt-extrusion processes as meltblowing, coforming, and spunbonding. Upon being melt-extruded, such compositions result in a fiber having a differential, increasing concentration of the additive from the center to the surface thereof, such that the concentration of additive toward the surface of the fiber is greater than the average concentration of additive in the more central region of the fiber and imparts to the surface of the fiber at least one desired characteristic which otherwise would not be present. The additive is miscible with the polymer at melt extrusion temperatures, under which conditions the additive and the polymer form a metastable solution. As the temperature of the newly formed fiber drops below melt extrusion temperatures, the additive becomes significantly less compatible with the polymer. Concurrent with this marked change in compatibility, the polymer begins to solidify. Both factors contribute to the rapid migration or segregation of the additive toward the surface which takes place in a controllable manner.

It subsequently was discovered that the use of an additive system comprising certain polysiloxane polyether additive s of U.S. Pat. No. 4,923,914 and a modified fumed silica having a hydrophobic surface unexpectedly gave a nonwoven web which was not wettable, but exhibited improved tensile strength characteristics as compared with a nonwoven web prepared from a thermoplastic composition lacking the hydrophobic fumed silica. This discovery is part of the disclosure of cross-referenced application Ser. No. 07/783,438 filed Oct, 25, 1991, U.S. Pat. No. 5,344,862. However, a further improvement of tensile strength characteristics, exceeding the improvements taught by application Ser. No. 07/783,438, filed Oct 25,1991, U.S. Pat. No. 5,344,862 now has been discovered.

Silica and other materials have been incorporated into thermoplastic polymers, including polypropylene. For example, the inclusion of an organic peroxide and a nucleating agent in polypropylene is described in Japanese Patent Publication No. 60-217207. The nucleating agent can be an organic salt, an organic compound, or an inorganic material such as silica, alum, titanium dioxide, carbon black, and various clay minerals.

References which describe the inclusion in polypropylene or other thermoplastic polymer of an organic material include U.S. Pat. Nos. 3,207,735 to Wijga (benzoic acid, substituted benzoic acids, hexahydro analogs thereof, and related compounds), 3,207,737 to Wales (aluminum salts of benzoic acid and related compounds), 3,207,739 to Wales (Group I and II metal salts of certain mono- and polycarboxylic acids), 3,299,029 to Binsbergen et at. (aluminum salts of benzoic acid and related compounds), 4,611, 024 to Wolfe (an acetal of an alditol and a hydrotalcite), and 4,808,650 to Titus et al. (fluorinated dibenzylidene sorbitol additives); and Japanese Patent Publication No. 51-22740 (benzylidene sorbitol).

Finally, studies relating to the heterogeneous nucleation of polymers have been reported. Examples of such studies include Chatterjee and Price, "Heterogeneous Nucleation of Crystallization of High Polymers from the Melt. I. Substrate-Induced Morphologies", *J. Polym. Sci.*,13,2369 (1975); Collington, "The Nucleation of Crystalline Olefins", *Polypropylene: The Way Ahead*, a conference of the Plastics and Rubber Institute, Madrid, Spain, November 1989; and Garg and Stein, "Crystallization and Morphology of Nucleated Polymers", Antec '88, 1021.

Notwithstanding the foregoing, it should be noted that neither the siloxane copolymers (whether polysiloxane polyethers or alkyl-substituted polysiloxanes) nor a modified fumed silica, when used alone, gave any improvement in tensile strength characteristics. For reasons not yet fully understood, there appears to be a synergy which results from the use of the modified fumed silica with either a polysiloxane polyether as taught by application Ser. No. 07/783, 438 filed Oct 25,1991, U.S. Pat. No. 5,344,862, or an alkyl-substituted polysiloxane as taught herein.

Without wishing to be bound by theory, it is believed that the alkyl-substituted polysiloxane serves three functions: (1) it acts as a dispersing agent for the modified fumed silica, thereby reducing or preventing flocculation of the silica into larger particles, especially after destructuring; (2) it helps reduce the surface free energy of the modified fumed silica which results in coated silica surfaces which are more readily "wet" by molten polyolefin; and (3) it acts as a processing aid for the entire system during the melt-extrusion process.

SUMMARY OF THE INVENTION

It therefore is an object of the present invention to provide a melt-extrudable thermoplastic composition which includes a thermoplastic polymer and an improved additive system.

It also is an object of the present invention to provide a melt-extrudable thermoplastic composition which includes a thermoplastic polyolefin and an improved additive system which in turn includes a first component and a second component.

It is another object of the present invention to provide an improved additive system for thermoplastic polymers.

It is another object of the present invention to provide an improved additive system for thermoplastic polyolefins, which improved additive system includes a first component and a second component.

It also is an object of the present invention to provide a method for preparing a shaped article having improved physical properties.

Further objects of the present invention are to provide a shaped article, such as a melt-extruded fiber or film, a melt-extruded article other than a fiber or a film, a low-temperature pressed article, a nonwoven web, a disposable absorbent article, and a disposable article.

These and other objects will be apparent to one having ordinary skill in the art from a consideration of the specification and claims which follow.

Accordingly, the present invention provides a melt-extrudable thermoplastic composition which includes a thermoplastic polymer and an improved additive system. Such system in its most basic form includes particles of a solid material, in which substantially all of the particles have a longest dimension in the range of from about 0.001 to about 1 micrometer and the particles have a polymerphilic surface as defined hereinafter. When the particles do not have a polymerphilic surface, they can be coated with a material which results in polymerphilic coated surfaces, in which case the coating material is referred to as the first component and the particles are referred to as the second component of the improved additive system.

The present invention also provides a melt-extrudable thermoplastic composition which includes a thermoplastic polyolefin and an improved additive system having a first component and a second component, in which:

(A) the first component is an alkyl-substituted polysiloxane having the general formula,

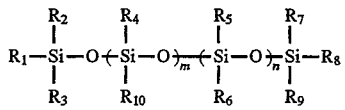

in which:
(1) $R_1$–$R_9$ are independently selected monovalent $C_1$–$C_3$ alkyl groups;
(2) $R_{10}$ is a monovalent $C_6$–$C_{30}$ alkyl group;
(3) m represents an integer of from about 5 to about 50;
(4) n represents an integer of from 0 to about 200;
(5) the first component has a number-average molecular weight of from about 3,000 to about 36,000; and
(6) the first component has a polydispersity of from about 1.1 to about 2.5;

(B) the second component is a hydrophobic fumed silica, in which the weight ratio of the first component to the second component is in the range of from about 10 to about 70 and substantially all of the second component is present as particles having a longest dimension in the range of from about 0.001 to about 1 micrometer; and (C) the improved additive system is present in an amount of from about 0.01 to about 3 percent by weight, based on the amount of thermoplastic polyolefin.

The present invention also provides a method for preparing a nonwoven web having significantly improved tensile strength characteristics, which method includes:

(A) melting a thermoplastic composition which includes a thermoplastic polyolefin and an improved additive system having a first component and a second component;

(B) forming fibers by extruding the resulting melt through a die;

(C) drawing the fibers; and (D) collecting the fibers on a moving foraminous surface as a web of entangled fibers;

in which:
(1) the first component is an alkyl-substituted polysiloxane having the general formula,

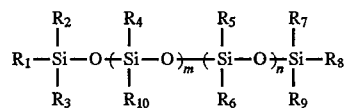

in which:
(a) $R_1$–$R_9$ are independently selected monovalent $C_1$–$C_3$ alkyl groups;
(b) $R_{10}$ is a monovalent $C_6$–$C_{30}$ alkyl group;
(c) m represents an integer of from about 5 to about 50;
(d) n represents an integer of from 0 to about 200;
(e) the first component has a number-average molecular weight of from about 3,000 to about 36,000; and
(f) the first component has a polydispersity of from about 1.1 to about 2.5;

(2) the second component is a hydrophobic fumed silica, in which the weight ratio of the first component to the second component is in the range of from about 10 to about 70 and substantially all of the second component is present as particles having a longest dimension in the range of from about 0,001 to about 1 micrometer; and (3) the improved additive system is present in an amount of from about 0.01 to about 3 percent by weight, based on the amount of thermoplastic polyolefin.

In certain desired embodiments, $R_1$–$R_9$ are methyl groups. In other desired embodiments, $R_{10}$ is a monovalent $C_{15}$–$C_{22}$ alkyl group. In still other desired embodiments, m represents an integer of from about 15 to about 25. In yet other desired embodiments, the first component has a number-average molecular weight of from about 8,000 to about 15,000.

The melt-extrudable thermoplastic composition of the present invention is particularly suited for the preparation of nonwoven webs useful in, the production of such disposable absorbent articles as diapers, incontinent products, sanitary napkins, tampons, wipes, and the like, and such disposable products as surgical gowns, shoe covers, workwear, and the like. Such composition also is useful for the preparation of melt-extruded films and articles other than fibers and films, low-temperature pressed articles, and the like.

DETAILED DESCRIPTION OF THE INVENTION

Figure 1:
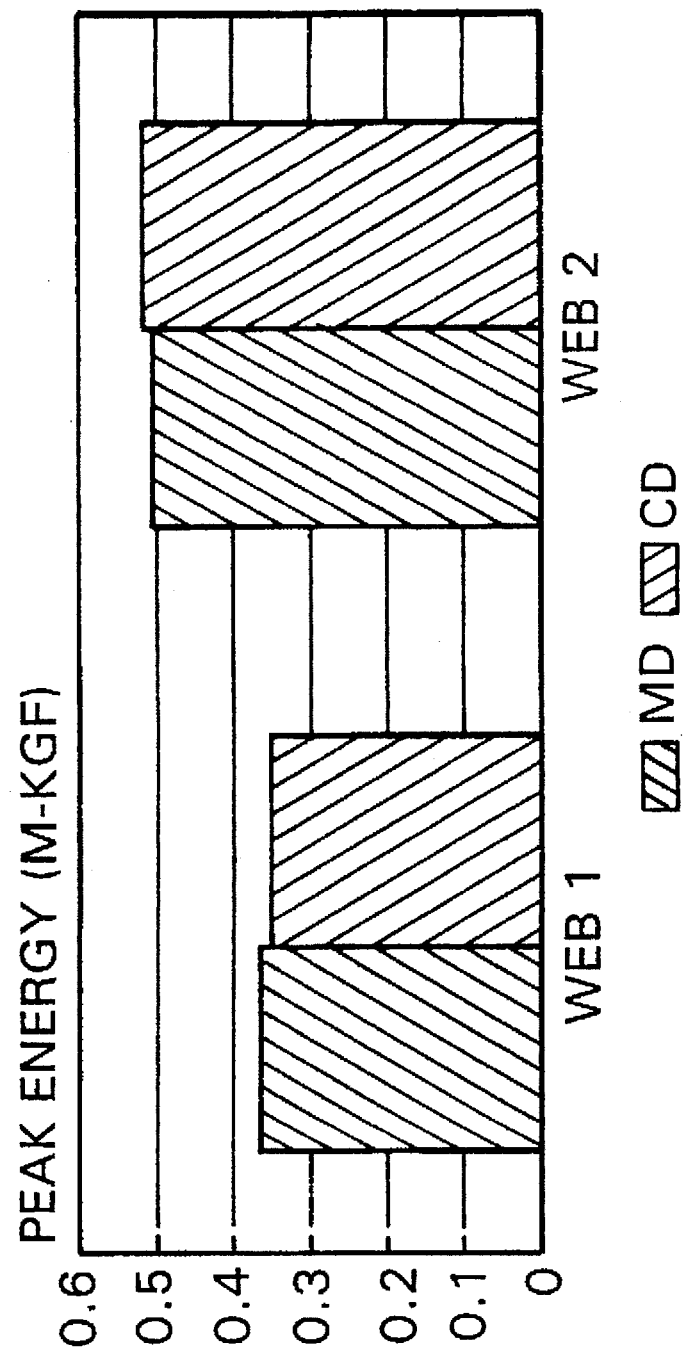
FIGS. 1–7, inclusive, are bar graphs comparing the tensile strength characteristics of nonwoven webs prepared in accordance with the present invention with such characteristics of control webs.

The term "physical properties" is used broadly herein to mean any one or more of the physical properties of a shaped article prepared in accordance with the present invention. The term also is intended to encompass properties of the shaped article during extrusion, particularly those which impinge on process variables or parameters. By way of illustration, physical properties of fibers includes tensile strength characteristics as defined hereinafter. For fibers which are hollow or porous, physical properties include, in addition to tensile strength characteristics, pore size distribution and average pore sizes. Physical properties of nonwoven webs include tensile strength characteristics (including cross-direction/machine-direction balance), abrasion resistance, and toughness and elongation. Film physical properties include film thickness (e.g., the ability to make thinner films), rarity, strength, and polymer batch variations. Microporous films are possible with polymers which previously were unsuitable, and generally more uniform pore distribution and smaller pore sizes with a narrower pore size distribution. With respect to shaped articles prepared by injection molding, physical properties include impact resistance, warpage (i.e., reduced no warpage), and low-temperature flexibility, among other low-temperature properties. Low-temperature pressing or cold-forming opportunities also are improved for many polymers.

As used herein, the term "fibers" includes substantially continuous fibers which are of a length such that they can be regarded as continuous in comparison with their diameters, such as may be produced by a meltblowing process. The term also includes continuous fibers, such as those produced by a spunbonding process or by a typical melt-spinning process. Thus, the term "continuous fibers" is intended to exclude substantially continuous fibers. In addition, the term is meant to include fibers having both circular and noncircular cross-sections, hollow fibers, and microporous fibers, among others.

The term "tensile strength characteristics", as used herein, has reference primarily to peak energy, peak load, peak elongation, and peak strain values as determined by Federal Test Method 5100 (Standard No. 191A). Other procedures, such as the trap tear test, can be used, however.

Such terms as "melt-extrudable", "melt-extruded", and the like are meant to refer or relate to any melt-extrusion process for forming a nonwoven web in which melt-extrusion to form fibers is followed by web formation, typically concurrently, on a foraminous support. The terms include, among others, such well-known processes as meltblowing, coforming, spunbonding, and the like. The terms also refer or relate to processes in which web formation is a separate, independent step after fiber formation; nonwoven webs prepared by such processes include bonded carded webs and the like.

As used herein, the term "weight ratio" means the approximate relationship by weight of the amount of first component in the improved additive system to the amount of second component. More specifically, the weight ratio is the quotient of the amount of first component divided by the amount of second component. Thus, the weight ratio is expressed as a whole number which represents the approximate weight of first component per unit weight of second component. Consequently, the weight ratio has no units.

The term "destructured" and variations thereof means a reduction in second component particle size. The term "additive system" refers generally to the combination of first and second components. The term "improved additive system" refers specifically to a combination of first component and second component in which the second component has been destructured, i.e., in which the particles of the second component are within the range specified herein.

Examples of thermoplastic polymers include, by way of illustration only, end-capped polyacetals, such as poly (oxymethylene) or polyformaldehyde, poly (trichloroacetaldehyde), poly(n-valeraldehyde), poly (acetaldehyde), and poly(propionaldehyde); acrylic polymers, such as polyacrylamide, poly(acrylic acid), poly (methacrylic acid), poly(ethyl acrylate), and poly(methyl methacrylate); fluorocarbon polymers, such as poly (tetrafluoroethylene), perfluorinated ethylenepropylene copolymers, ethylene-tetrafluoroethylene copolymers, poly (chlorotrifluoroethylene), ethylene-chlorotrifluoroethylene copolymers, poly(vinylidene fluoride), and poly(vinyl fluoride); polyamides, such as poly(6-aminocaproic acid) or poly(-caprolactam), poly(hexamethylene adipamide), poly (hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1, 4-phenyleneoxy-1,4-phenylene-isopropylidene- 1,4-phenylene), and poly(sulfonyl- 1,4-phenyleneoxy-1,4-phenylenesulfonyl-4,4'-biphenylene); polycarbonates, such as poly(bisphenol A)orpoly(carbonyldioxy-1,4-phenyleneisopropylidene- 1,4-phenylene); polyesters, such as poly(ethylene terephthalate), poly(tetramethylene terephthalate), and poly-(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1, 4-phenylene); polyimides, such as poly-(pyromellitimido-1, 4-phenylene); polyolefins, such as polyethylene, polypropylene, poly(1-butene), poly(2-butene), poly(1-pentene), poly(2-pentene), poly(3-methyl-1-pentene), poly (4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), and polystyrene; copolymers of the foregoing, such as acrylonitrile-butadiene-styrene (ABS) copolymers; and mixtures of any of the foregoing in which the components are the same type of polymer or two or more different types of polymers.

In general, the term "thermoplastic polyolefin" is used herein to mean any thermoplastic polyolefin which can be used for the preparation of nonwoven webs by melt extrusion. Examples of thermoplastic polyolefins include those identified above. In certain embodiments, the polyolefins are those which contain only hydrogen and carbon atoms and which are prepared by the addition polymerization of one or more unsaturated monomers. Examples of such polyolefins include, among others, polyethylene, polypropylene, poly (1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like.

Because of their commercial importance, polyethylene and polypropylene most commonly are employed. For example, polypropylene often is the polymer of choice for the preparation of nonwoven webs which are employed in a variety of disposable products. In one polypropylene embodiment, the polypropylene has a skewed molecular weight range in which the ratio of the z-average molecular weight to the weight average molecular weight (the z-average molecular weight/weight-average molecular weight ratio) is equal to or greater than about 2 and less than about 5. Such a skewed molecular weight range polypropylene can be obtained by cracking a polypropylene having a broad molecular weight distribution.

In addition, the term "thermoplastic polyolefin" is meant to include blends of two or more polyolefins and random and block copolymers prepared from two or more different unsaturated monomers. Blends of two or more polyolefins in some cases can provide remarkable and unexpected improvements in tensile strength characteristics, an example of which is a blend of two propylene polymers having different melt flow rates. More particularly, such a blend consists of (1) from about 60 to about 40 percent by weight of a polypropylene having a melt flow rate of from about 30 to about 45 and (2) from about 40 to about 60 percent by weight of a polypropylene having a melt flow rate of from about 2 to about 10. Such a blend typically will have a melt flow rate of from about 18 to about 30.

The most basic embodiment of the present invention is represented by a melt-extrudable thermoplastic composition which includes a thermoplastic polymer and an improved additive system which encompasses particles of a solid material, in which substantially all of the particles have a longest dimension in the range of from about 0.001 to about 1 micrometer and the particles have a polymerphilic surface.

As used herein with reference to such particles, the term "polymerphilic" means that the surfaces of the particles have a surface free energy which is equal to or less than the surface free energy of the polymer. In other words, molten polymer "wets" the surfaces of the particles to an extent sufficient to achieve an improvement in one or more physical properties of a shaped article prepared from the thermoplastic composition of which the particles are a component. When the particles do not have a polymerphilic surface, they can be coated with a material which results in polymerphilic coated surfaces, in which case the coating material is referred to as the first component and the particles are referred to as the second component.

The composition and the additive system of the present invention typically contain both a first component and a second component. By way of illustration, the first component can be an alkyl-substituted polysiloxane having the general formula,

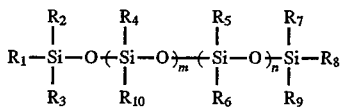

in which:
(1) $R_1$–$R_9$ are independently selected monovalent $C_1$—$C_3$ alkyl groups;
(2) $R_{10}$ is a monovalent $C_6$–$C_{30}$ alkyl group;
(3) m represents an integer of from about 5 to about 50;
(4) n represents an integer of from 0 to about 200;
(5) the first component has a number-average molecular weight of from about 3,000 to about 36,000; and
(6) the first component has a polydispersity of from about 1.1 to about 2.5.

As noted, $R_1$–$R_9$ are independently selected monovalent $C_1$–$C_3$ alkyl groups. In particular, $R_1$–$R_9$ are independently selected methyl or ethyl groups. More particularly, $R_1$–$R_9$ are methyl groups. While $R_{10}$ in general is a monovalent $C_6$–$C_{30}$ alkyl group, $R_{10}$ particularly is a monovalent $C_{15}$–$C_{22}$ alkyl group.

In general, m represents an integer of from about 5 to about 50 and n represents an integer of from 0 to about 200. In particular, m represents an integer of from about 15 to about 25 and n represents and integer of from about 40 to 80.

The number-average molecular weight of the first component can be in the range of from about 3,000 to about 36,000. In particular, the first component will have a number-average molecular weight of from about 8,000 to about 15,000. While the polydispersity of the first component in general will be in the range of from about 1.1 to about 2.5, in particular the polydispersity will be in the range of from about 1.1 to about 1.5.

The first component in general can be either a liquid or a solid. Regardless of its type, a liquid first component is desired. The use of a liquid first component simplifies the preparation of the claimed improved additive system and composition, as will be described later.

The term "first component" is used broadly herein to encompass the use of more than one first component in a given composition or improved additive system, i.e., a mixture of two or more first components or alkyl-substituted polysiloxanes. Moreover, it should be appreciated by those having ordinary skill in the art that the first component as defined herein typically is not available as a pure compound. Thus, the presence of impurities or related materials which may not come within the general formula given above for the first component does not remove any given material from the spirit and scope of the present invention.

The second component of the composition and the improved additive system of the present invention can be, for example, a hydrophobic fumed silica. The nature of the hydrophobic silica surface is not known to be critical. As with the first component, more than one second component or hydrophobic fumed silica can be employed, if desired.

In general, fumed silicas typically have surface areas in the range of from about 80 to about 410 m$^2$/g. Fumed silicas are readily prepared by known methods; see, for example, by way of illustration only, U.S. Pat. Nos. 2,863,738 to Antwerp, 3,423,184 to Biegler et al., 3,642,453 to Chilton et al., 4,048,290 to Lee, and 4,292,290 to Tunison, III.

The surface of fumed silica has three chemical groups: (1) isolated hydroxy groups, (2) hydrogen-bonded hydroxy groups, and (3) siloxane groups. Thus, the surface generally is hydrophilic, although the siloxane groups are hydrophobic. The hydrophilic silica surface of a fumed silica, however, can be rendered hydrophobic by reacting surface hydroxy groups with a hydrophobic reagent. Suitable reagents include polydimethylsiloxane, dimethyldichlorosilane, hexamethyldisilazane, and the like. Indeed, these three reagents have been used commercially to produce hydrophobic fumed silicas which are available from the Cab-O-Sil Division of Cabot Corporation, Tuscola, Ill., as CAB-O-SIL® TS-720, TS-610, and TS-530, respectively. However, the nature of the reagent employed is not known to be critical. It is expected that any reagent could be used which renders the fumed silica surface hydrophobic. See, by way of illustration, U.S. Pat. No. 4,849,022 to Kobayashi and Ohnishi.

As described in application Ser. No. 07/783,438, filed Oct 25, 1991, U.S. Pat. No. 5,344,862 fumed silica is characterized by its extremely small particle size and large surface area. Molten spheres or primary particles of silica are produced by the hydrolysis of silicon tetrachloride vapor in a flame of hydrogen and oxygen. Such primary particles of silica typically have diameters in the range of from about 0.007 to about 0.027 micrometers. Upon their formation, however, such primary particles collide and fuse with one another to form branched, three-dimensional, chain-like aggregates. Some reversible mechanical agglomeration or entanglement also takes place as the aggregates cool below the fusion temperature of silica. Thus, commercially available fumed silicas have particle sizes of from about 1 to roughly 80 micrometers, with the majority of the particles being in the 40–60 micrometer range. In use in application Ser. No. 0/783,438, filed Oct. 25, 1991, U.S. Pat. No. 5,344,862 it was conjectured that mechanical size reduction occurred as a result of a combination of melt extrusion temperatures with shearing forces which take place in the extruder and upon extrusion through the die. Such size reduction was believed to result in a particle size distribution ranging from about 1 to about 20 micrometers or so. The majority of the particles were believed to have sizes in the upper portion of the range, i.e., roughly 10–20 micrometers.

In view of continued work with commercial modified fumed silicas, it now is believed from microscopy analysis that the majority of agglomerated particles are in the range of from about 70 to about 80 micrometers. In addition, the size reductions resulting from melt extrusion now are deemed to be less than originally believed. Consequently, a particularly desirable embodiment of the present invention is grounded in the discovery that significantly reducing the second component particle sizes results in even greater improvements in tensile strength characteristics. For convenience, the term "improved additive system" refers to an additive system in which the particle sizes of the second component have been reduced, as already noted.

In general, the method employed for reducing the particle sizes of the second component is not known to be critical. However, particle size reduction desirably will take place under conditions which will not permit significant flocculation to occur. An advantage of an additive system which includes a first component and a second component is that the first component coats the second component particles and aids in the prevention of flocculation. In addition to preventing the flocculation of second component, the first component also acts as a dispersing aid for the second component and can act as a processing aid for the melt extrusion of the composition containing the improved additive system.

The second component can be reduced to the appropriate particle size range by any means known to those having ordinary skill in the art. As already stated, the particles of second component desirably should be within the range of from about 0.001 to about 1 micrometer. In certain embodiments, the particle size range will be from about 0.2 to about 0.8 micrometer. In other embodiments, the particle size range will be from about 0.4 to about 0.6 micrometer. As a practical matter, a particularly effect method of reducing the particle sizes of the second component involves the use of ultrasonic energy such as can be supplied by any of the known ultrasonic probes which are commercially available in sizes ranging from laboratory to production models.

Second component particle size reduction can be accomplished either before or after the second component is added to the first component. If such reduction is accomplished through the use of ultrasonic energy, it generally will be necessary to suspend the second component in a suitable liquid which can be a solvent or first component. Suitable solvents include, by way of illustration only, water; lower molecular weight alcohols, such as methanol, ethanol, and propanol; lower molecular weight ketones, such as acetone and methyl ethyl ketone; and the like. When the second component is a hydrophobic fumed silica, ethanol has been found to be an especially suitable solvent. Higher molecular weight solvents can be employed, if desired, although lower boiling point solvents are more readily removed at the completion of the particle size reduction process.

When both a first component and a second component are employed, the second component is dispersed in the first component by any known means, usually after the desired particle size range of the second component has been obtained. Wet-grinding motormills, such as are available commercially, are effective in accomplishing further particle size reduction and the desired dispersion.

The weight ratio of first component to second component in the improved additive system generally will be in the range of from about 10 to about 70. In particular, the weight ratio of first component to second component will be in the range of from about 10 to about 30. When a first component is not required, i.e., the particles already have polymerphilic surfaces, the amount of particles used generally will vary from about 0.0002 to about 0.3 percent by weight, based on the amount of thermoplastic polymer.

The improved additive system typically is added to the thermoplastic polyolefin in an amount which is the range of from about 0.01 to about 3 percent by weight, based on the amount of thermoplastic polyolefin. In particular, the improved additive system will be present at a level of from about 0.1 to about 1 percent by weight, and more particularly at a level of from about 0.1 to about 0.5 percent by weight.

The thermoplastic composition of the present invention can be prepared by any number of methods known to those having ordinary skill in the art. For example, the polymer in chip or pellet form and the improved additive system can be mixed mechanically to coat the polymer particles with improved additive system. If desired, the improved additive system can be dispersed, or dissolved and dispersed in the case where the first component is soluble, in a suitable solvent to aid the coating process, although the use of a solvent is not preferred. The coated polymer then can be added to the feed hopper of the extruder from which the fibers will emerge. However, care must be taken to ensure complete dispersion of the improved additive system throughout the bulk of the polymer during extrusion.

Alternatively, the coated polymer can be charged to a heated compounder, such as a heated twin-screw compounder, in order to disperse the improved additive system throughout the bulk of the polymer. The resulting thermoplastic composition typically is extruded as reds which are fed to a chipper. The resulting chips (or pellets) then serve as the feed stock for a melt-processing extruder. In a variation of this procedure, the level of improved additive system present in the polymer is higher than that required in the polymer to be extruded into fibers. The improved additive system-containing polymer chips (often referred to as concentrate pellets) then are admixed with or metered into the polymer feed stock.

In another method, the improved additive system can be metered into the throat of the hopper which contains the polymer in particulate form and which feeds the extruder. In yet another method, the improved additive system can be metered directly into the barrel of the extruder where it is blended with the molten polymer as the resulting mixture moves toward the die.

Turning now to the method of the present invention, a nonwoven web having significantly improved tensile strength characteristics is prepared by the method which includes:

(A) melting a thermoplastic composition which includes a thermoplastic polyolefin and an improved additive system having a first component and a second component;

(B) forming fibers by extruding the resulting melt through a die;

(C) drawing the fibers; and (D) collecting the fibers on a moving foraminous surface as a web of entangled fibers;

in which:

(1) the first component is an alkyl-substituted polysiloxane having the general formula,

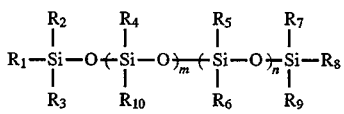

in which:
(a) $R_1$–$R_9$ are independently selected monovalent $C_1$—$C_3$ alkyl groups;
(b) $R_{10}$ is a monovalent $C_6$–$C_{30}$ alkyl group;
(c) m represents an integer of from about 5 to about 50;
(d) n represents an integer of from 0 to about 200;
(e) the first component has a number-average molecular weight of from about 3,000 to about 36,000; and
(f) the first component has a polydispersity of from about 1.1 to about 2.5;
(2) the second component is a hydrophobic fumed silica, in which the weight ratio of the first component to the second component is in the range of from about 10 to about 70 and substantially all of the second component is present as particles having a longest dimension in the range of from about 0.001 to about 1 micrometer; and
(3) the improved additive system is present in an amount of from about 0.01 to about 3 percent by weight, based on the amount of thermoplastic polyolefin.

In the first step of the method of the present invention, a thermoplastic composition which includes a thermoplastic polyolefin and an improved additive system having a first component and a second component as already defined is melted. This typically is done in an extruder which is an integral part of the apparatus used to form fibers. The temperature and residence time in the extruder are dependent primarily on the thermoplastic polyolefin employed. Thus, such parameters can be determined readily by one having ordinary skill in the art without undue experimentation.

Fibers then are formed by extruding the molten mixture through a die. Although the nature of the die is not known to be critical, it most often will have a plurality of orifices arranged in one or more rows extending the full machine width. Such orifices may be circular or noncircular in cross-section.

The fibers then are drawn, typically by entraining them in a fluid stream having a sufficiently high velocity. When continuous fibers are produced, the fibers first are cooled in a quenching fluid which usually is low pressure air. The fluid stream which draws the fibers, usually air, can be a stream of high velocity air separate from the quenching fluid, or it can be a portion of the quenching fluid which is accelerated by passage into a narrow nozzle. In the production of substantially continuous fibers, on the other hand, the fluid stream usually is a heated, high velocity stream of air which draws the fibers while they are in an at least partially molten or softened state.

The drawn fibers then are collected on a moving foraminous surface as a web of entangled fibers. The foraminous surface can be, by way of example only, a revolving drum or a continuous belt or wire screen; the latter is most commonly used on commercial-scale equipment.

In general, the steps of melting, forming, drawing, and collecting are carried out as described in such processes as meltblowing, spunbonding, and the like. By way of illustration only, such processes are exemplified by the following references which are incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et at., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et at., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973); and (b) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

If continuous fibers are formed, such as by a spunbonding process, the resulting web must be pattern bonded by the application of heat and pressure in order for the nonwoven web to exhibit improved tensile strengths characteristics. Preferably, such application of heat and pressure will be in the ranges of from about 80° C. to about 180° C. and from about 150 to about 1,000 pounds per linear inch (59–178 kg/cm), respectively. More preferably, a pattern having from about 10 to about 250 bonds/inch$^2$ (1–40 bonds/cm$^2$) covering from about 5 to about 30 percent of the surface area of the nonwoven web will be employed.

Such pattern bonding is accomplished in accordance with known procedures. See, for example, U.S. Pat. No. Des. 239,566 to Vogt, U.S. Pat. No. Des. 264,512 to Rogers, U.S. Pat. No. 3,855,046 to Hansen et al., and U.S. Pat. No. 4,493,868, supra, for illustrations of bonding patterns and a discussion of bonding procedures.

A nonwoven web having improved tensile strength characteristics also is prepared by the method which comprises:

(A) melting a thermoplastic composition which includes a thermoplastic polyolefin and an improved additive system having a first component and a second component;
(B) forming continuous fibers by extruding the resulting melt through a die;
(c) drawing the continuous fibers;
(D) collecting the continuous fibers into a tow;
(E) cutting the tow into staple fibers;
(F) laying the staple fibers onto a moving foraminous surface as a web of entangled fibers; and
(G) pattern bonding the resulting web of entangled fibers by the application of heat and pressure; in which the first component and second component are as already defined.

Each of the foregoing steps is carded out as already described or by any of several means which are well known to those having ordinary skill in the art. If desired, individual continuous fibers can be false twisted before collecting them as a tow. Moreover, the tow can be crimped before cutting into staple-length fibers. Although the staple fibers can be laid onto the moving foraminous support by any known means, the fibers preferably will be either air-laid or wet-laid. Finally, the pattern bonding of the resulting nonwoven web can be by known means as already described hereinabove.

In addition to fibers and nonwoven webs, films, injection-molded shaped articles, and low-temperature pressing techniques also can be prepared form a composition of the present invention by methods well known to those having ordinary skill in the art.

Without wishing to be bound by theory, it is believed that the remarkable results achieved through the use of particles or second component as described herein are a consequence of the unexpected, rapid nucleation of the thermoplastic polymer. Such rapid nucleation behavior and the observed morphological changes in the thermoplastic composition of the present invention produce unexpected lamellar row morphology and pronounced elastic recovery at high strength ratios. Consequently, such thermoplastic compositions result in melt-extruded shaped articles, such as fibers, having hard elastic properties. In addition, such thermoplastic compositions are suitable for processing into microporous membranes, e.g., hollow fibers and films.

The present invention is further described by the examples which follow. Such examples, however, are not to be construed as limiting in any way either the spirit or scope of the present invention. In the examples, all parts are by weight unless stated otherwise.

EXAMPLE 1

Preparation of Spunbonded Webs

Spunbonded nonwoven webs were prepared on a pilot-scale apparatus essentially as described in U.S. Pat. No. 4,340,563, which is incorporated herein by reference.

The thermoplastic polyolefin employed was Escorene 3445 polypropylene (Exxon Chemical Americas, Houston, Tex. 77079). According to the manufacturer, the polymer has a density of 0.90 g/cc and a melt flow rate of 35 g/10 minutes.

The first component of the improved additive system was an alkyl-substituted polysiloxane which can be represented by the following formula:

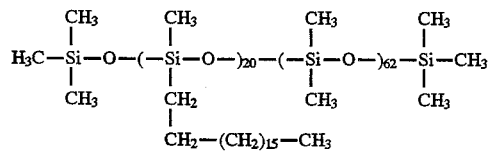

The polysiloxane first component had a number-average molecular weight of about 11,000 and a polydispersity of about 1.3.

The second component of the improved additive system was CAB-O-SIL® TS-720, a hydrophobic fumed silica supplied by Cab-O-Sit Division, Cabot Corporation, Tuscola, Ill. The material as supplied had particle sizes in the range of from about 0.1 to about 10 micrometers.

The second component was dispersed in the first component at a weight ratio of 20 (i.e., 20 parts first component and 1 part second component). The mixture of first component and second component (for a total of 2,500 g) was run through a five-liter wet-grinding motormill three times in order to completely disperse the second component in the first component. Total milling time was approximately two hours. The achievement of the desired particle size reduction of second component was verified qualitatively by visual observation and by viscosity measurements.

To prepare the spunbonding feed pellets, additive system was metered (pumped) into a twin-screw extruder downstream from the extruder feed hopper at a rate equivalent to 0.3 percent by weight, based on the amount of polypropylene. The pumping rate of the additive system, the weight of the additive system container, and the polymer feed rate were monitored in order to control the level of additive system in the polymer. The resulting molten blend of polymer and additive system was extruded as a plurality of reds 2-3 mm in diameter. The rods were passed through a water bath, air dried, and pelletized. The additive system level in the resulting pellets was confirmed by elemental analysis for silicon. The pellets were stored in plastic-lined boxes.

The more significant process variables for the spunbonding process generally were as follows:

extruder temperature, 182°-238° C.;

melt inlet temperature, 182°-238° C.;

throughput, 25 kg per hour (0.7 grams per hole per minute);

spin head temperature, 238° C.;

pack temperature, 231 ° C.;

pack pressure, 490 psig; and melt temperature, 238° C.

Two webs were formed, each of which had a basis weight of about 38 grams per square meter (gsm): (1) a control web prepared from virgin polypropylene, and (2) a web prepared from polypropylene feed pellets containing 0.3 percent by weight of improved additive system, i.e., additive system in which the second component had been destructured. Each web was thermally pattern bonded at about 138°-140° C. and about 12 psi. The pattern employed had 123 bonds/inch$^2$ (19 bonds/cm$^2$) covering about 16.9 percent of the web surface area.

Mean peak energy, peak load, and percent elongation values for each web were determined in accordance with Federal Test Method 5100 (Standard No. 191A). The apparatus employed was an Instron Model 1122 Universal Testing Instrument with an Instron Micron II Desk Top Console Integrator (Instron Corporation, Canton, Mass.). The jaw span gap was 3 inches (7.6 cm) and web sample dimensions were 3"×6" (7.62 cm×15.2 cm). In general, at least ten samples from each web were run. Each web was tested in both the machine direction (MD) and the cross direction (CD). The data are summarized in Tables 1 and 2.

In order to aid in an appreciation of the extent of improvement or increase in each test parameter value which resulted from the presence of improved additive system, Tables 1 and 2 include "Percent Increase" columns after each test parameter value. In each case, the percent increase (PI) was calculated by subtracting the control value from the value obtained from the inclusion of the additive system in the polymer from which the web was prepared, dividing the difference by the first control value, and multiplying the quotient by 100.; i.e., PI =100×(improved value−control value)/control value.

TABLE 1

Tensile Strength Characteristics for the Webs of Example 1

| Web | Direction | Peak Energy (m-kgF) | Percent Increase | Peak Load (kgF) | Percent Increase |
|---|---|---|---|---|---|
| 1 | MD | 0.365 | — | 11.7 | — |
|   | CD | 0.351 | — | 7.8 | — |
| 2 | MD | 0.507 | 39 | 16.3 | 39 |
|   | CD | 0.518 | 48 | 12.9 | 65 |

TABLE 2

Tensile Strength Characteristics for the Webs of Example 1

| Web | Direction | Percent Elong. (%) | Percent Increase |
|---|---|---|---|
| 1 | MD | 61 | — |
|   | CD | 81 | — |
| 2 | MD | 92 | 51 |
|   | CD | 102 | 26 |

Tables 1 and 2 indicate that the use of the improved additive system in accordance with the present invention results in significant increases in the tensile strength characteristics of the nonwoven webs. In general, peak energy improvements were essentially the same in both the machine and cross directions. Peak load improvements were more pronounced in the machine direction than the cross direction, while the opposite was the case with respect to improvements in percent elongation.

Figure 2:
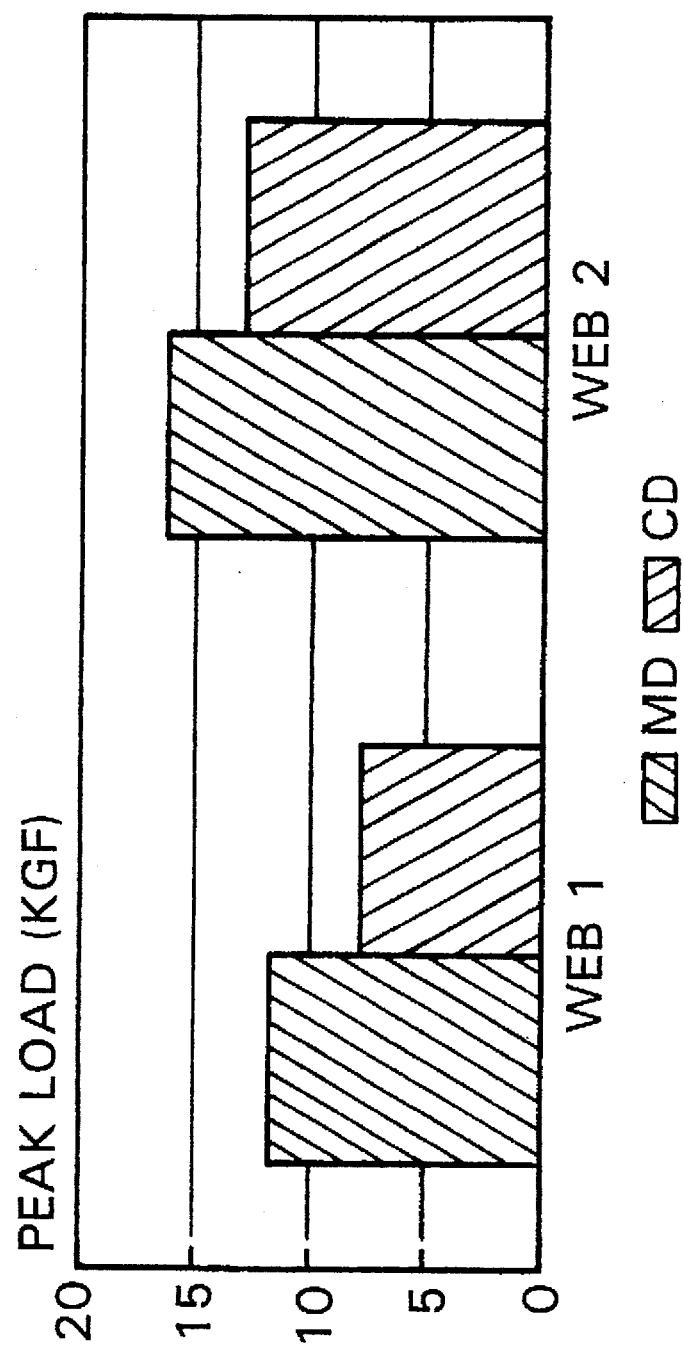
Figure 3:
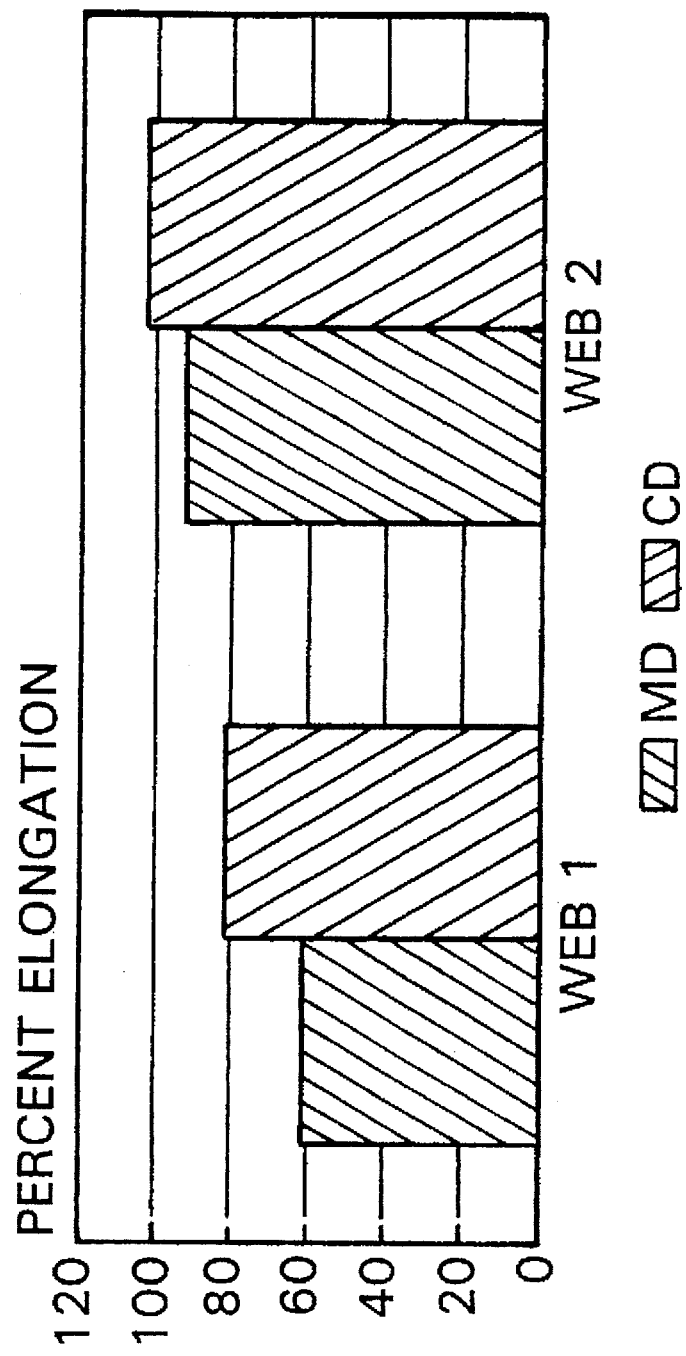
Figure 4:
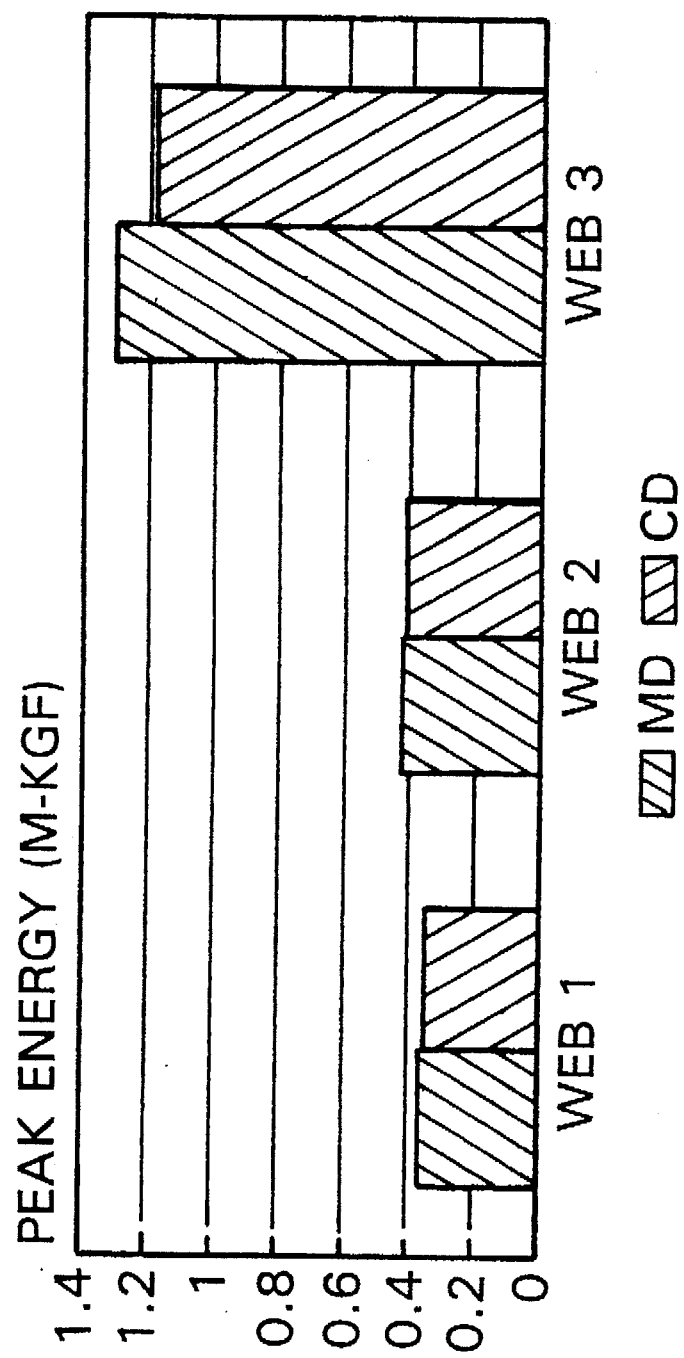
Figure 5:
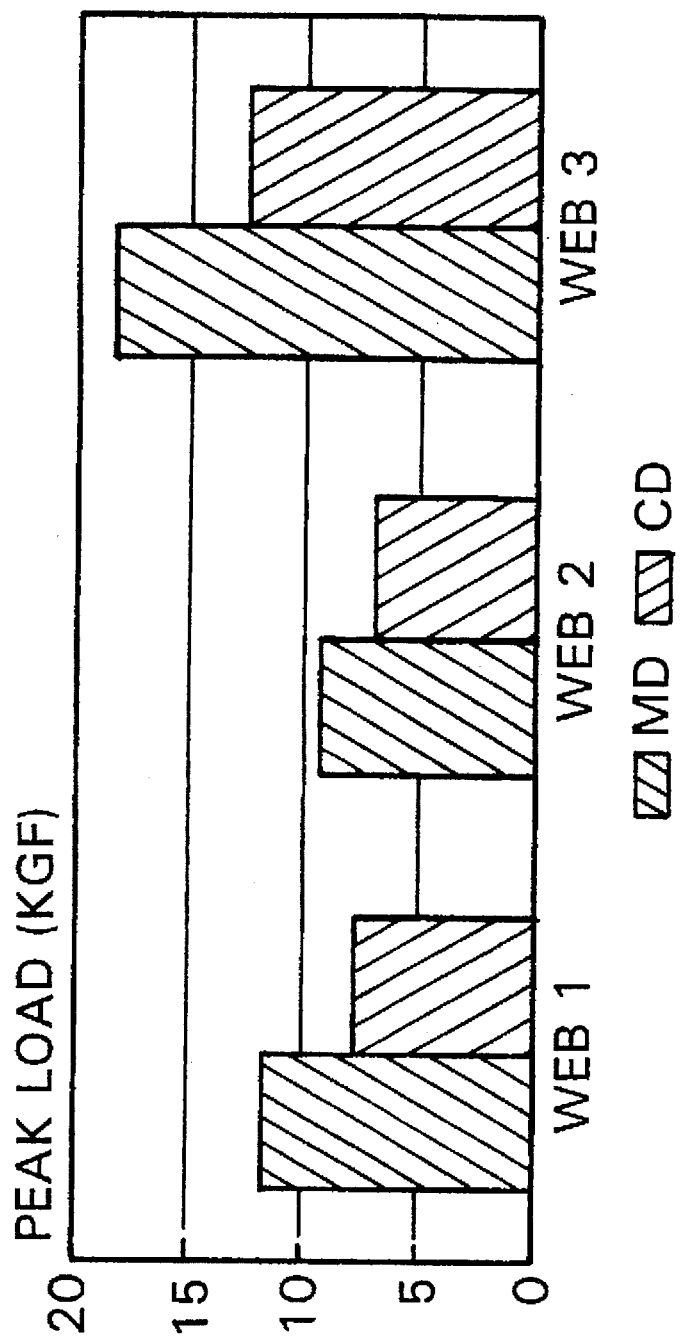
Figure 6:
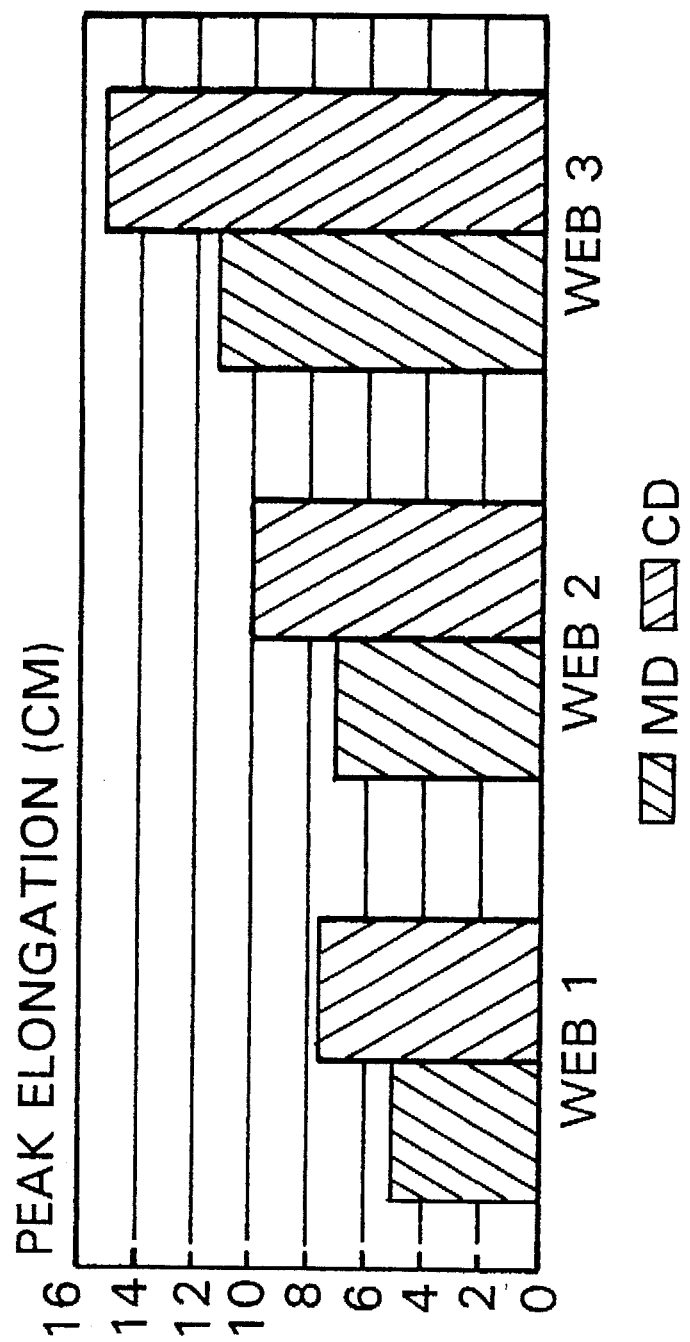
Figure 7:
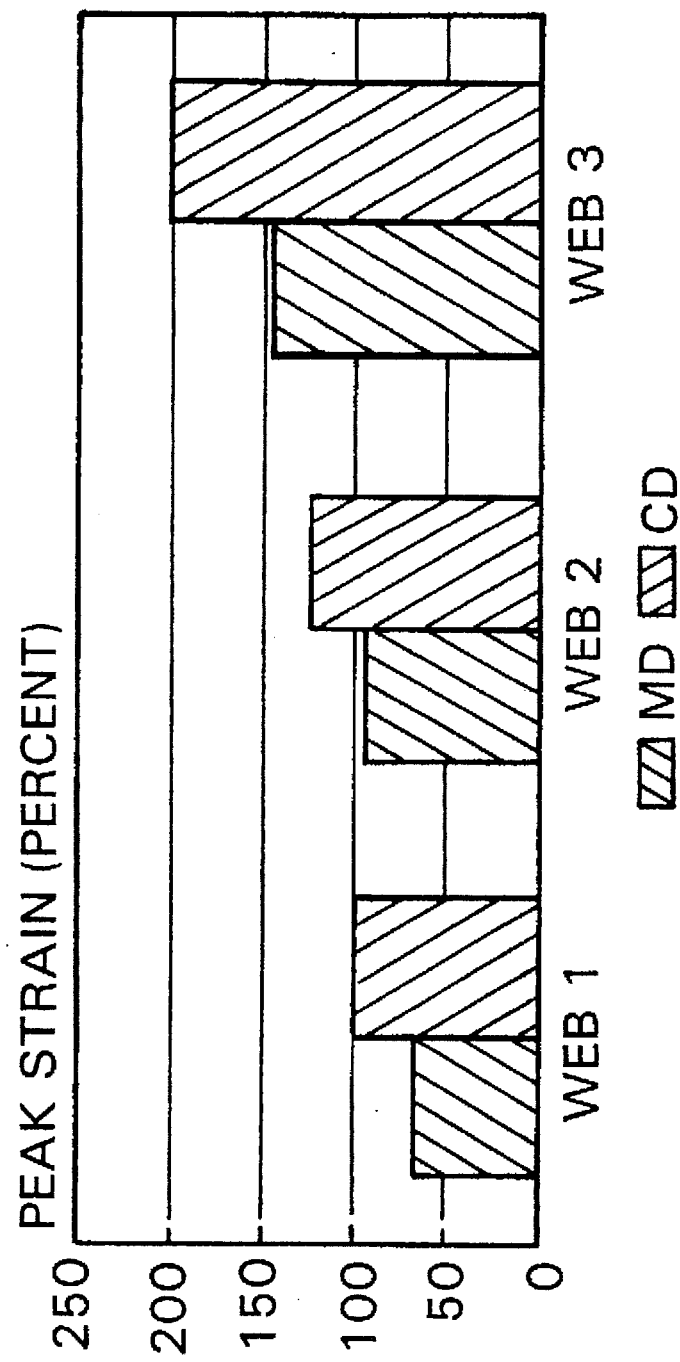

To aid in the visualization of the improvements demonstrated by the data in Tables 1 and 2, the data have been plotted as bar graphs as shown in FIGS. 1-3 inclusive. Both the machine direction value and the cross direction value for each web are included in each figure.

EXAMPLE 2

Preparation of Spunbonded Webs

The procedure of Example 1 was repeated, except that the thermoplastic polymer consisted of a blend consisting of 50 weight-percent of the Escorene 3445 polypropylene employed in Example 1 and 50 weight-percent Escorene 1052 (Exxon Chemical Americas, Houston, Tex. 77079). According to the manufacturer, Escorene 1052 has a melt flow rate of 5 g/10 minutes. The melt flow rate of the blend was 22 g/10 minutes.

Three different spunbonded webs having basis weights of about 38 gsm were prepared:

(1) a first control web prepared from the polypropylene blend alone;

(2) a second control web prepared from the polypropylene blend which contained 0.3 percent by weight of additive mixture in which the second component had not been structured; and (3) a web prepared from the polypropylene blend which contained 0.3 percent by weight of additive mixture in which the second component had been destructured.

Each web was thermally pattern bonded as described in Example 1. As in Example 1, various tensile strength characteristics were determined in accordance with Federal Test Method 5100 (Standard No. 191A). In this case, the tensile strength characteristics determined were mean peak energy, peak load, peak elongation, and peak strain. The results are presented in Tables 3 and 4. As with Example 1, the tables include percent increase columns for each characteristic.

TABLE 3

Tensile Strength Characteristics for the Webs of Example 2

| Web | Direction | Peak Energy (m-kgF) | Percent Increase | Peak Load (kgF) | Percent Increase |
|---|---|---|---|---|---|
| 1 | MD | 0.365 | — | 11.7 | — |
|   | CD | 0.351 | — | 7.8 | — |
| 2 | MD | 0.418 | 12 | 9.3 | −21 |
|   | CD | 0.408 | 16 | 7.0 | −10 |
| 3 | MD | 1.304 | 257 | 18.2 | 56 |
|   | CD | 1.182 | 237 | 12.5 | 60 |

TABLE 4

Tensile Strength Characteristics for the Webs of Example 2

| Web | Direction | Peak Elong. (cm) | Percent Increase | Peak Strain (%) | Percent Increase |
|---|---|---|---|---|---|
| 1 | MD | 5.1 | — | 67.1 | — |
|   | CD | 7.6 | — | 99.7 | — |
| 2 | MD | 7.1 | 39 | 94.6 | 41 |
|   | CD | 10.0 | 32 | 125 | 25 |
| 3 | MD | 11.2 | 120 | 146 | 118 |
|   | CD | 15.2 | 100 | 201 | 102 |

It is clear from Tables 3 and 4 that the use of the improved additive system in accordance with the present invention results in significant increases in the tensile strength characteristics of the nonwoven webs. In general, the improvements are more pronounced in the machine direction, although the improvements in the cross direction are substantial. Since Tables 3 and 4 indicate percent improvements relative to the first control or web 1, Table 5 lists the percent improvement of each tensile strength characteristic for web 3 relative to web 2, the second control. In the table, "PI" represents "Percent Increase." Table 5 emphasizes the importance of the particle size limitations embodiment for the second component of the improved additive system of the present invention.

TABLE 5

Percent Improvement for Web 3 Compared to Second Control Web 2

| Web | Direction | PI Peak Energy | PI Peak Load | PI Peak Elong. | PI Peak Strain |
|---|---|---|---|---|---|
| 3 | MD | 212 | 97 | 57 | 54 |
|   | CD | 190 | 79 | 58 | 60 |

To aid in the visualization of the improvements demonstrated by the data in Tables 3 and 4, the tensile characteristics data have been plotted as bar graphs as shown in FIGS. 4-7, inclusive. Both the machine direction value and the cross direction value for each web are included in each figure. It is clear from FIGS. 4-7 that peak energy is more sensitive to the inclusion in the polymer of the additive system. That is, the peak energy values were increased significantly more than were the values for the other three tensile strength characteristics.

In order to evaluate the effects of the improved additive system on individual fibers, tenacity measurements were made on fibers isolated during the spunbonding process before being laid on the moving foraminous support. Such fibers were compared with fibers from the first control, i.e., fibers prepared from the polypropylene blend alone. The two types of fibers are referred to as "web 3 fibers" and "web 1 fibers," respectively. The results of these measurements are summarized in Table 6 Which lists the average of 25 determinations. The table also includes percent improvement (PI) data as the third line in the table, rather than as separate columns. In each case, however, percent improvement was calculated as already described.

TABLE 6

Tenacity Measurements of Single Fibers

| Sample | Modulus (GPa) | Stress (MPa) | Strain (E %) |
|---|---|---|---|
| Web 1 Fibers | 2.2 | 183.7 | 174.8 |
| Web 3 Fibers | 5.2 | 293.7 | 527.4 |
| PI | 136 | 60 | 202 |

Figure 8:
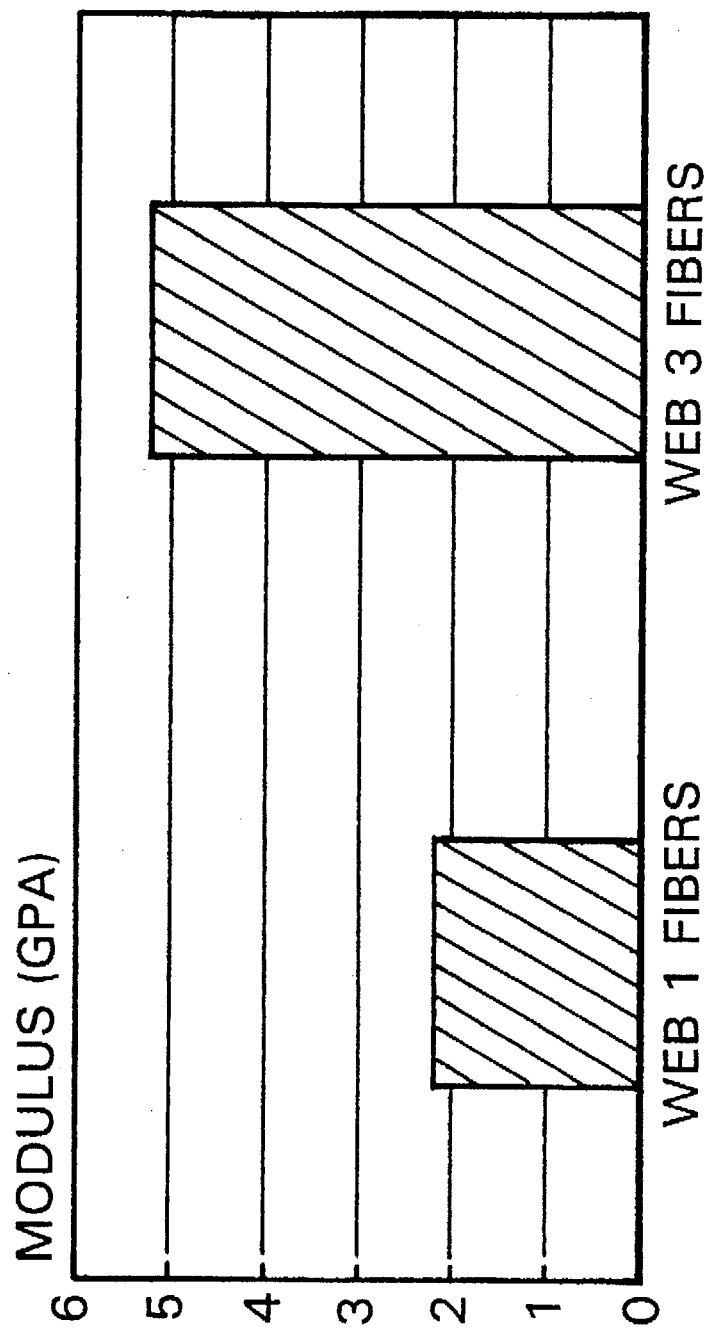
FIGS. 8–10, inclusive, are bar graphs comparing the tenacity characteristics of fibers prepared in accordance with the present invention with such characteristics of control fibers.
Figure 9:
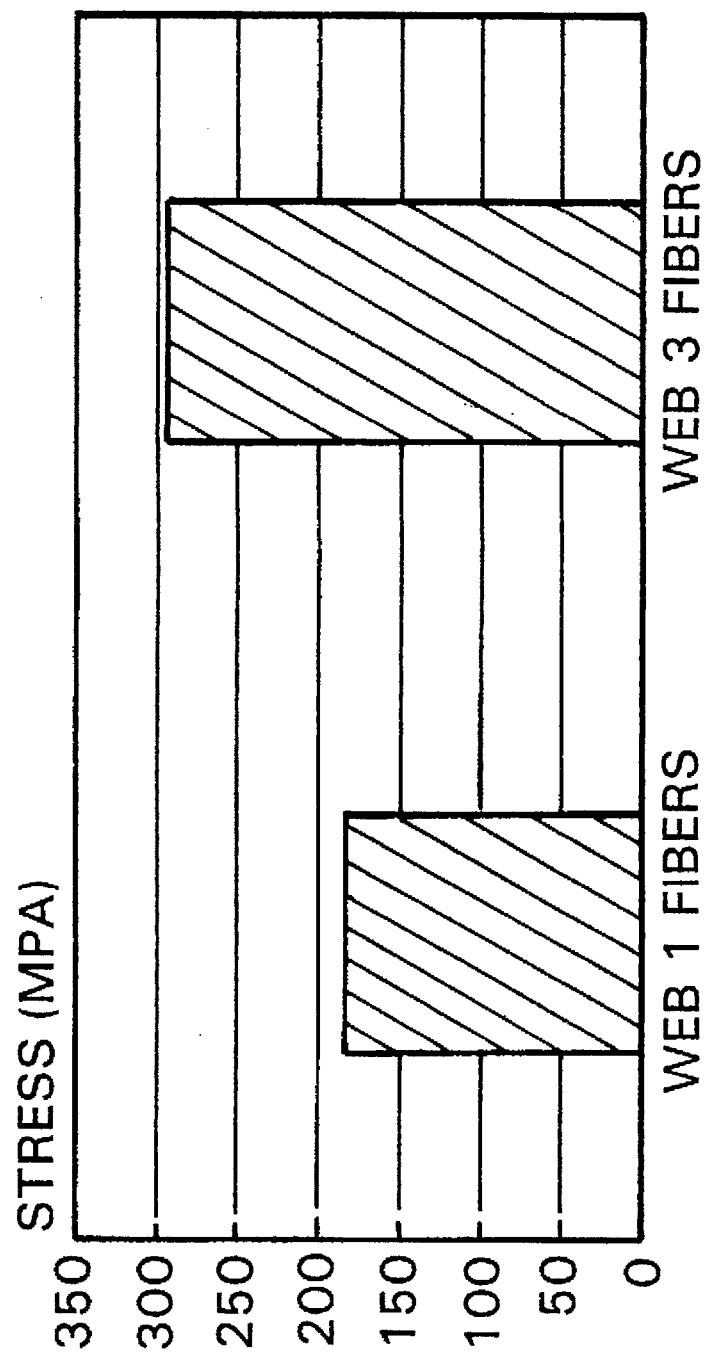
Figure 10:
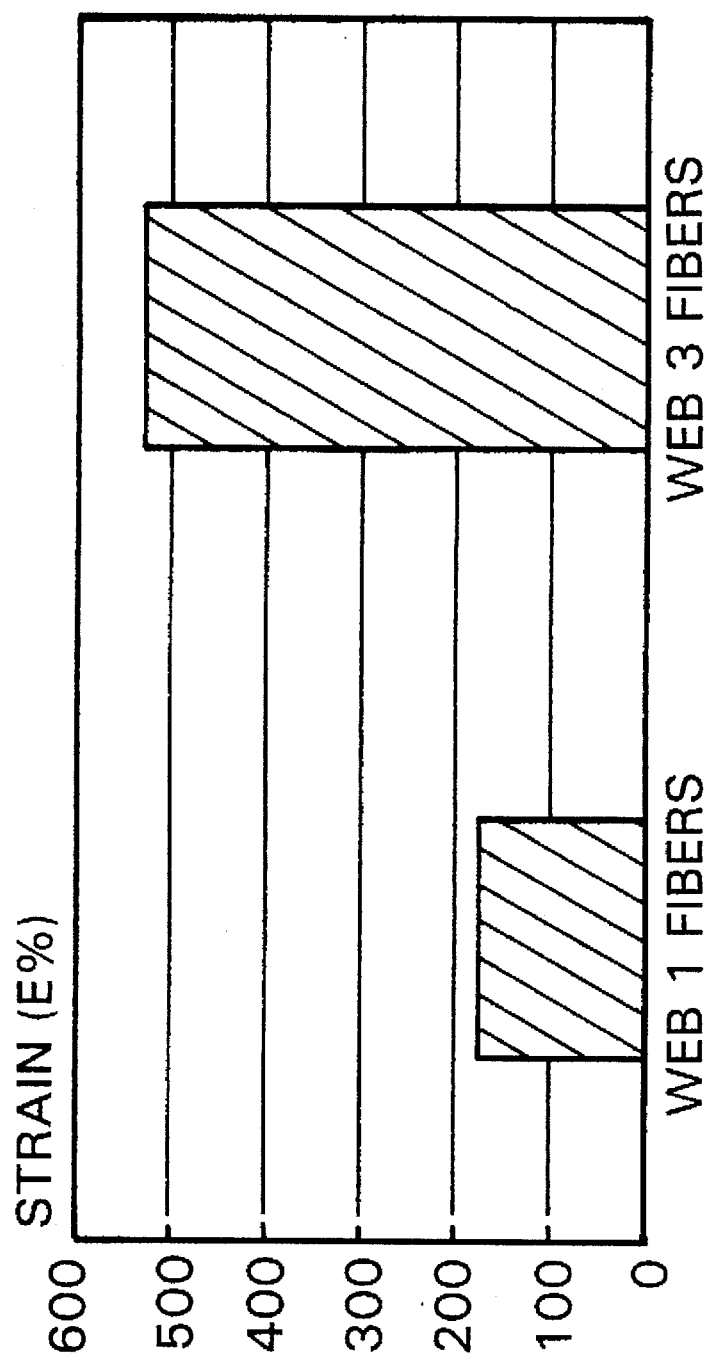
Figure 11:
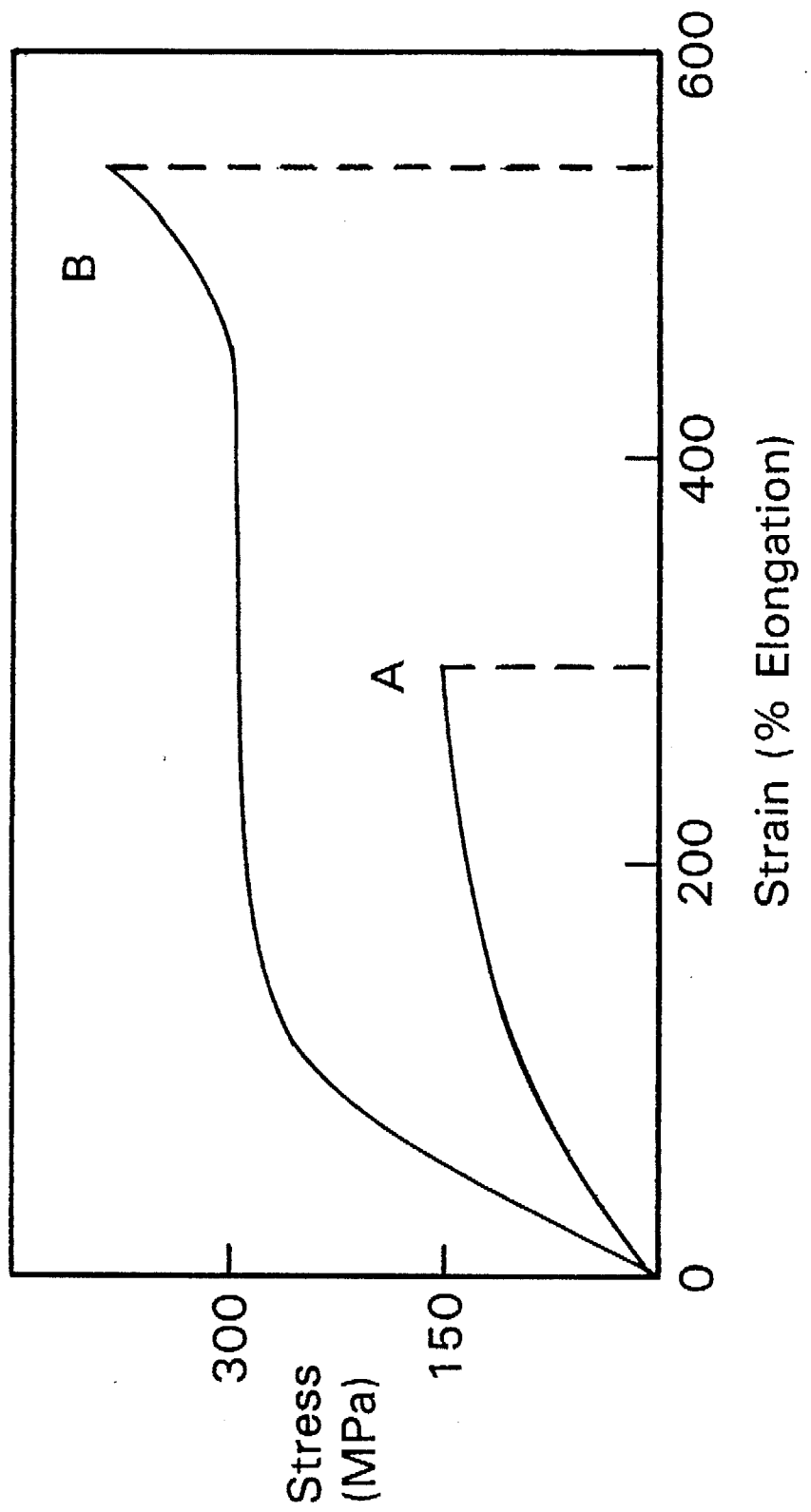
FIG. 11 shows typical stress-strain curves for fibers prepared in accordance with the present invention and for control fibers.

Consistent with past practice as an aid in the visualization of the improvements demonstrated by the data in Table 6, the tenacity data have been plotted as bar graphs as shown in FIG. 8–10. Typical stress-strain curves are shown in FIG. 11 in which curve A represents web 1 fibers and curve B represents web 3 fibers.

Having thus described the invention, numerous changes and modifications hereof will be readily apparent to those having ordinary skill in the art without departing from the spirit or scope of the invention.

What is claimed is:

1. A melt-extrudable thermoplastic composition which comprises a thermoplastic polyolefin and an improved additive system comprising a first component and a second component, in which:

(A) said first component is an alkyl-substituted polysiloxane having the general formula,

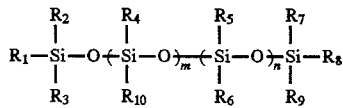

in which:

(1) $R_1$–$R_9$ are independently selected monovalent $C_1$–$C_3$ alkyl groups;
(2) $R_{10}$ is a monovalent $C_6$–$C_{30}$ alkyl group;
(3) m represents an integer of from about 5 to about 50;
(4) n represents an integer of from 0 to about 200;
(5) said first component has a number-average molecular weight of from about 3,000 to about 36,000; and
(6) said first component has a polydispersity of from about 1.1 to about 2.5;

(B) said second component is a hydrophobic fumed silica, in which the weight ratio of the said first component to said second component is in the range of from about 10 to about 70; and (C) said improved additive system is present in an amount of from about 0.01 to about 3 percent by weight, based on the amount of thermoplastic polyolefin.

2. The composition of claim 1, in which substantially all of said second component is present as particles having a longest dimension in the range of from about 0.001 to about 1 micrometer.

3. The composition of claim 2, in which each of $R_1$–$R_9$ is a methyl group, $R_{10}$ is a monovalent $C_{15}$–$C_{22}$ alkyl group, m represents an integer of from about 15 to about 25, n represents an integer of from about 40 to about 80, and said first component has a number-average molecular weight of from about 8,000 to about 15,000.

4. The composition of claim 3, in which said polyolefin is polypropylene.

5. The composition of claim 4, in which said polypropylene has a skewed molecular weight range in which the z-average molecular weight/weight-average molecular weight ratio is equal to or greater than about 2 and less than about 5.

6. The composition of claim 4, in which said polypropylene is a blend of two propylene polymers having different melt flow rates.

7. The composition of claim 6, in which said blend consists of (a) from about 60 to about 40 percent by weight of a polypropylene having a melt flow rate of from about 30 to about 45 and (b) from about 40 to about 60 percent by weight of a polypropylene having a melt flow rate of from about 2 to about 10.

8. The composition of claim 3, in which said first component is present in an amount of from about 0.1 to about 0.5 percent by weight, based on the amount of thermoplastic polyolefin.

9. The composition of claim 3, in which the weight ratio of said first component to said second component is in the range of from about 10 to about 30.

10. A method for preparing a nonwoven web having significantly improved tensile strength characteristics which comprises (A) melting a thermoplastic composition which includes a thermoplastic polyolefin and an improved additive system having a first component and a second component;

(B) forming fibers by extruding the resulting melt through a die;

(C) drawing the fibers; and (D) collecting the fibers on a moving foraminous surface as a web of entangled fibers;

in which:

(1) the first component is an alkyl-substituted polysiloxane having the general formula,

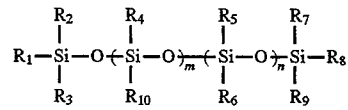

in which:

(a) $R_1$–$R_9$ are independently selected monovalent $C_1$–$C_3$ alkyl groups;
(b) $R_{10}$ is a monovalent $C_6$–$C_{30}$ alkyl group;
(c) m represents an integer of from about 5 to about 50;
(d) n represents an integer of from 0 to about 200;
(e) the first component has a number-average molecular weight of from about 3,000 to about 36,000; and
(f) the first component has a polydispersity of from about 1.1 to about 2.5;

(2) the second component is a hydrophobic fumed silica, in which the weight ratio of the first component to the second component is in the range of from about 10 to about 70; and (3) the improved additive system is present in an amount of from about 0.01 to about 3 percent by weight, based on the amount of thermoplastic polyolefin.

11. The method of claim 10, in which substantially all of the second component is present as particles having a longest dimension in the range of from about 0.001 to about 1 micrometer.

12. The method of claim 11, in which said polyolefin is polypropylene.

13. The method of claim 12, in which said polypropylene has a skewed molecular weight range in which the z-average molecular weight/weight-average molecular weight ratio is equal to or greater than about 2 and less than about 5.

14. The method of claim 12, in which said polypropylene is a blend of two propylene polymers having different melt flow rates.

15. The method of claim 14, in which said blend consists of (a) from about 60 to about 40 percent by weight of a polypropylene having a melt flow rate of from about 30 to about 45 and (b) from about 40 to about 60 percent by weight of a polypropylene having a melt flow rate of from about 2 to about 10.

16. The method of claim 10, which includes the additional step of pattern bonding by the application of heat and pressure the web of entangled fibers resulting from step (D).

17. A composition which comprises a first component and a second component, in which:

(A) said first component is an alkyl-substituted polysiloxane having the general formula,

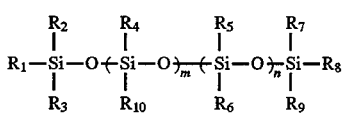

in which:

(1) $R_1$–$R_9$ are independently selected monovalent $C_1$–$C_3$ alkyl groups;

(2) $R_{10}$ is a monovalent $C_6$–$C_{30}$ alkyl group;

(3) m represents an integer of from about 5 to about 50;

(4) n represents an integer of from 0 to about 200;

(5) said first component has a number-average molecular weight of from about 3,000 to about 36,000; and (6) said first component has a polydispersity of from about 1.1 to about 2.5; and (B) said second component is a hydrophobic fumed silica, in which the weight ratio of the said first component to said second component is in the range of from about 10 to about 70.

18. The composition of claim 17, in which substantially all of said second component is present as particles having a longest dimension in the range of from about 0.001 to about 1 micrometer.

19. The composition of claim 18, in which each of $R_1$–$R_9$ is a methyl group, $R_{10}$ is a monovalent $C_{15}$–$C_{22}$ alkyl group, m represents an integer of from about 15 to about 25, n represents an integer of from about 40 to about 80, and said first component has a number-average molecular weight of from about 8,000 to about 15,000.

20. A film prepared from the composition of claim 1.

21. A film prepared from the composition of claim 2.

22. A film prepared from the composition of claim 4.

23. A microporous film prepared from the composition of claim 1.

24. A microporous film prepared from the composition of claim 2.

25. A microporous film prepared from the composition of claim 4.

* * * * *

UNITED STATES PATENT AND TRADEMARK OFFICE
CERTIFICATION OF CORRECTION

PATENT NO. : 5,665,803            Page 1 of 2

DATED       : September 9, 1997

INVENTOR(S): Ronald S. Nohr, et al.

It is certified that error appears in the above-identified patent and that said Letters Patent is hereby corrected as shown below:

In the Abstract, line 31, "0,001" should read --0.001--;
    Column 1, line 47, "additive s" should read --additives--;
    Column 2, line 9, "4,611, 024" should read --4,611,024--;
    Column 2, line 18, "13,2369" should read --13, 2369--;
    Column 2, line 32, "Oct 25, 1991" should read --Oct. 25, 1991--;
    Column 4, line 24, "0,001" should read --0.001--;
    Column 5, line 11, "rarity" should read --clarity--;
    Column 6, line 22, "(bisphenol A) orpoly" should read --(bisphenol A) or poly--;
    Column 7, line 18, "l" should read --1--;
    Column 8, line 50, "Oct" should read --Oct.--;
    Column 9, line 28, "of second" should read --of the second--;
    Column 10, line 35, "reds" should read --rods--;
    Column 12, line 5, "et at. "should read --et al.--;
    Column 12, line 8, "et at. "should read --et al.--;
    Column 12, line 29, "strengths" should read --strength--;
    Column 12, line 51, "(c)" should read --(C)--;
    Column 12, line 61, "carded" should read --carried--;

UNITED STATES PATENT AND TRADEMARK OFFICE
CERTIFICATE OF CORRECTION

PATENT NO. : 5,665,803

DATED : September 9, 1997

INVENTOR(S) : Ronald S. Nohr, et al.

It is certified that error appears in the above-identified patent and that said Letters Patent is hereby corrected as shown below:

Column 13, line 3, "known" should read --any known--;
Column 13, line 7, "form" should read --from--;
Column 13, line 57, "Cab-O-Sit" should read --Cab-O-Sil--;
Column 14, line 13, "reds" should read --rods--;
Column 16, line 36, "dear" should read --clear--;
Column 17, line 12, "Which" should read --which--;
Column 17, line 31, "FIG. "should read --FIGS.--;
Column 19, line 32, "the web" should read --on the web--.

Signed and Sealed this

Twenty-fourth Day of February, 1998

Attest:

BRUCE LEHMAN

*Attesting Officer*      *Commissioner of Patents and Trademarks*